United States Patent
Raza et al.

(10) Patent No.: US 11,650,380 B2
(45) Date of Patent: May 16, 2023

(54) FIBER CONNECTOR ASSEMBLY

(71) Applicant: Fiber Mountain, Inc., Cheshire, CT (US)

(72) Inventors: Mohammad H. Raza, San Jose, CA (US); Boby Joseph, Shrewsbury, MA (US); Andrew J. Martin, Guilford, CT (US); Robert C. O'Neil, Bethel, CT (US)

(73) Assignee: Green Lambda Corporation, Norman, OK (US)

( * ) Notice: Subject to any disclaimer, the term of this patent is extended or adjusted under 35 U.S.C. 154(b) by 0 days.

(21) Appl. No.: 16/040,232

(22) Filed: Jul. 19, 2018

(65) Prior Publication Data

US 2019/0025526 A1 Jan. 24, 2019

Related U.S. Application Data (60) Provisional application No. 62/534,633, filed on Jul. 19, 2017.

(51) Int. Cl.
*G02B 6/38* (2006.01)

(52) U.S. Cl.
CPC ......... *G02B 6/3895* (2013.01); *G02B 6/3825* (2013.01); *G02B 6/3879* (2013.01); *G02B 6/3885* (2013.01); *G02B 6/3897* (2013.01)

(58) Field of Classification Search
CPC ............................ G02B 6/3879; G02B 6/3895
See application file for complete search history.

(56) References Cited

U.S. PATENT DOCUMENTS

| | | | | |
|---|---|---|---|---|
| 6,971,895 B2* | 12/2005 | Sago | .................... | G02B 6/3895 |
| | | | | 439/188 |
| 7,374,101 B2* | 5/2008 | Kaneko | .............. | G06K 7/10178 |
| | | | | 235/492 |
| 7,623,784 B1* | 11/2009 | Pan | ........................ | H04B 10/07 |
| | | | | 398/58 |
| 8,757,895 B2* | 6/2014 | Petersen | .............. | G02B 6/3817 |
| | | | | 385/78 |
| 9,140,859 B2 | 9/2015 | Anderson et al. | | |
| 9,652,709 B2* | 5/2017 | Downie | ............. | G06K 19/0717 |
| 10,032,102 B2* | 7/2018 | Downie | ............. | G06K 19/0717 |
| 2004/0117515 A1* | 6/2004 | Sago | .................... | G02B 6/3895 |
| | | | | 710/1 |
| 2004/0120657 A1* | 6/2004 | Sago | .................... | G02B 6/3807 |
| | | | | 385/88 |

(Continued)

FOREIGN PATENT DOCUMENTS

| | | |
|---|---|---|
| CN | 105467529 | 4/2016 |
| CN | 105629395 | 6/2016 |
| WO | 2016073494 | 5/2016 |

OTHER PUBLICATIONS

International Search Report and Written Opinion mailed in corresponding PCT/US2018/042938 dated Oct. 15, 2018 (8 pages).

(Continued)

*Primary Examiner* — Rhonda S Peace
(74) *Attorney, Agent, or Firm* — Wissing Miller LLP (57) ABSTRACT

The present disclosure provides embodiments of fiber optic cable connectors, sleeves for fiber optic cable connectors, fiber optic cable adapters and fiber optic connector assemblies that incorporate intelligent systems that can identify presence and exchange information.

14 Claims, 11 Drawing Sheets

(56) References Cited

U.S. PATENT DOCUMENTS

| | | | |
|---|---|---|---|
| 2005/0215119 A1* | 9/2005 | Kaneko | G06K 7/10178 |
| | | | 439/607.01 |
| 2007/0116411 A1 | 5/2007 | Benton et al. | |
| 2008/0100456 A1* | 5/2008 | Downie | G02B 6/3825 |
| | | | 340/572.8 |
| 2010/0079248 A1* | 4/2010 | Greveling | G06K 19/07749 |
| | | | 340/10.1 |
| 2011/0116748 A1 | 5/2011 | Smrha et al. | |
| 2011/0222819 A1* | 9/2011 | Anderson | G02B 6/3893 |
| | | | 385/78 |
| 2014/0023326 A1 | 1/2014 | Anderson et al. | |
| 2015/0293311 A1 | 10/2015 | Coffey et al. | |
| 2016/0266330 A1 | 9/2016 | Zhang | |
| 2019/0025526 A1* | 1/2019 | Raza | G02B 6/3825 |

OTHER PUBLICATIONS

International Preliminary Report on Patentability mailed in corresponding PCT/US18/42938 dated Jan. 30, 2020.
Supplementary European Search Report mailed in EP 18835957.4 dated Nov. 27, 2020, 7 pgs.
First Examination Report from Australian Patent Office mailed in corresponding AU application 2018304374 dated Apr. 29, 2022 (4 pages).
Communication pursuant to Article 94(3) EPC mailed in corresponding EP 18835957.4 dated Dec. 21, 2022 (7 pages).
First Office Action and Search Report mailed in corresponding Chinese application 201880059548.X dated Mar. 9, 2023 (8 pages).

* cited by examiner

FIBER CONNECTOR ASSEMBLY

CROSS REFERENCE TO RELATED APPLICATIONS

The present disclosure is based on and claims benefit from co-pending U.S. Provisional Application Ser. No. 62/534,633 filed Jul. 19, 2017 entitled "Fiber Connector Assembly" the entire contents of which are incorporated herein by reference.

BACKGROUND

Field

The present disclosure relates generally to fiber connector assemblies and more particularly to fiber connector assemblies that include a sleeve that fits over a fiber cable connector and an adapter that receives the fiber cable connector and sleeve.

SUMMARY

The present disclosure includes embodiments of fiber cable connectors, sleeves for fiber cable connectors, fiber cable adapters and fiber connector assemblies that incorporate intelligent systems that can identify presence and exchange information. In one exemplary embodiment, a fiber optic cable connector assembly includes a fiber optic cable connector, a sleeve and a fiber optic cable adapter. The fiber optic cable connector has a housing and a ferrule extending from the housing. The sleeve has a body with a central opening, a media interface housing extending from the body and at least one electrical storage media, such as an EEPROM, within the media interface housing. The sleeve is configured to fit over the fiber optic cable connector housing. The fiber optic cable adapter has a housing that includes a body, a presence detecting switch and a storage media read/write interface. The body has a central opening configured to receive at least the ferrule of the connector. The presence detecting switch is configured to actuate when the ferrule is inserted into the central opening of the adapter housing. The storage media read/write interface is capable of reading from and writing to the at least one electrical storage media. The fiber optic cable connector assembly may also include an RFID tag that is secured to the sleeve body and that can be read by a RFID reader. The fiber optic cable connector assembly may include a multi-fiber cable connector and adapter, or a single fiber cable connector and adapter.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides embodiments of fiber cable connectors, sleeves for fiber cable connectors, fiber cable adapters and fiber connector assemblies that incorporate intelligent systems that can identify presence and exchange information. For ease of description, the fiber cable connectors may also be referred to herein as the "connector" in the singular and the "connectors" in the plural. The fiber cable connector sleeves may also be referred to herein as the "sleeve" in the singular and the "sleeves" in the plural. The fiber cable adapters may also be referred to herein as the "adapter" in the singular and the "adapters" in the plural. The fiber connector assemblies may also be referred to herein as the "assembly" in the singular and the "assemblies" in the plural. Each assembly includes at least one connector, sleeve and corresponding adapter.

The connectors and adapters contemplated herein may be multi-fiber connectors and adapters, or single fiber connectors and adapters. Each multi-fiber connector contemplated herein is capable of mating with a corresponding multi-fiber adapter, and each single fiber connector contemplated herein is capable of mating with a corresponding single fiber adapter. Non-limiting examples of multi-fiber connectors and adapters include Multi-fiber Push On ("MPO") type connectors and adapters, which are sometimes called MTP connectors and adapters, MXC connectors and adapters, and other connectors and adapters capable of trunking more than one fiber in a single jacket. Non-limiting examples of single fiber connectors and adapters include Lucent ("LC"), SC, FC/PC connectors and adapters, and other connector and adapter types that terminate single fiber cables. The sleeves are configured to attach to multi-fiber connectors or single fiber connectors.

Turning to the figures and in particular FIGS. 1-4, an exemplary embodiment of a multi-fiber connector with a multi-fiber sleeve according to the present disclosure is shown. The multi-fiber connector 10 may be a male connector or a female connector. The multi-fiber connector 10 is, in this exemplary embodiment, a known MPO connector that can be operatively connected to a multi-fiber cable 12. The sleeve 30 is configured to fit over the housing 14 of the connector 10 so that the ferrule 16 of the connector can mate with an adapter, as described below. The connector 10 and sleeve 30 are collectively the assembly 50, seen in FIG. 3. In one exemplary embodiment, the sleeve 30 has a body 32 with a central opening 34 that can be configured to slide over the housing 14 of the connector 10. The body 32 has inner walls 36 that define the central opening 34. To interlock the sleeve 30 to the connector housing 14, tabs may extend from one or more inner walls 36 that snap into corresponding slots 18 in the connector housing 14. In another exemplary embodiment, the sleeve 30 may be a two-piece structure that include a first half and a second half that can be joined together around the connector housing 14 with a snap locking fit. In another exemplary embodiment, the sleeve 30 may be integrally molded into the connector housing 14.

Figure 1:
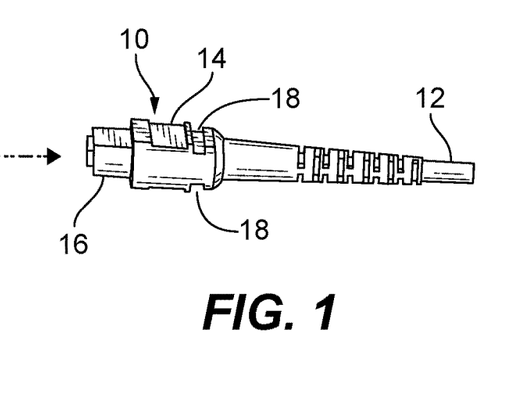
FIG. 1 is a perspective view of a fiber optic high-density connector.
Figure 2:
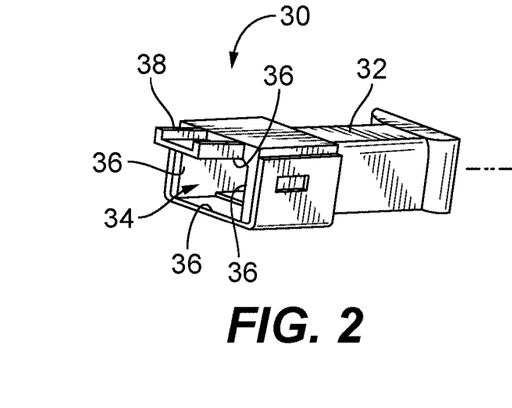
FIG. 2 is a perspective view of an exemplary embodiment of a fiber optic high-density sleeve according to the present disclosure.
Figure 3:
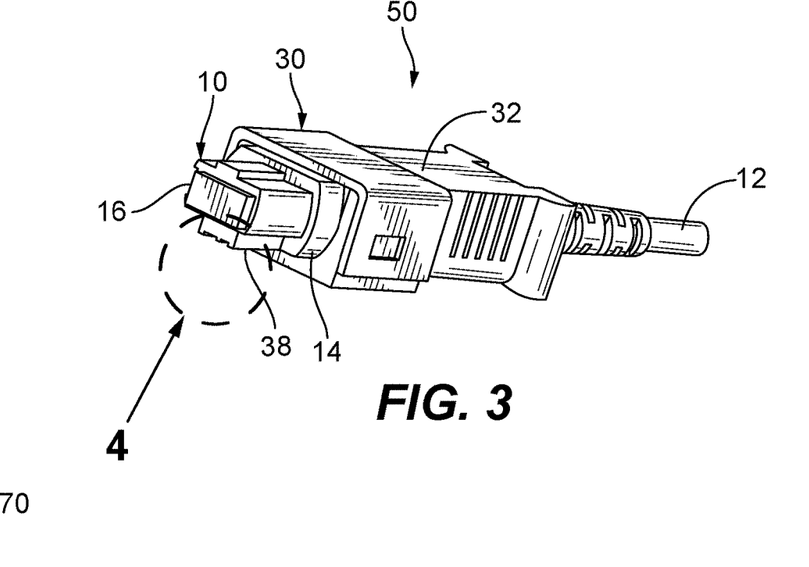
FIG. 3 is a perspective view of an exemplary embodiment of a fiber optic high-density connector with the fiber optic high-density sleeve according to the present disclosure.
Figure 4:
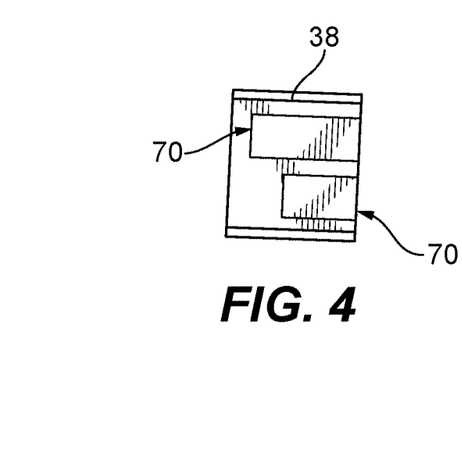
FIG. 4 is a bottom plan view of a chip assembly incorporated into the fiber optic high-density sleeve of FIG. 2 taken from detail 4 in FIG. 3.
Figure 17:
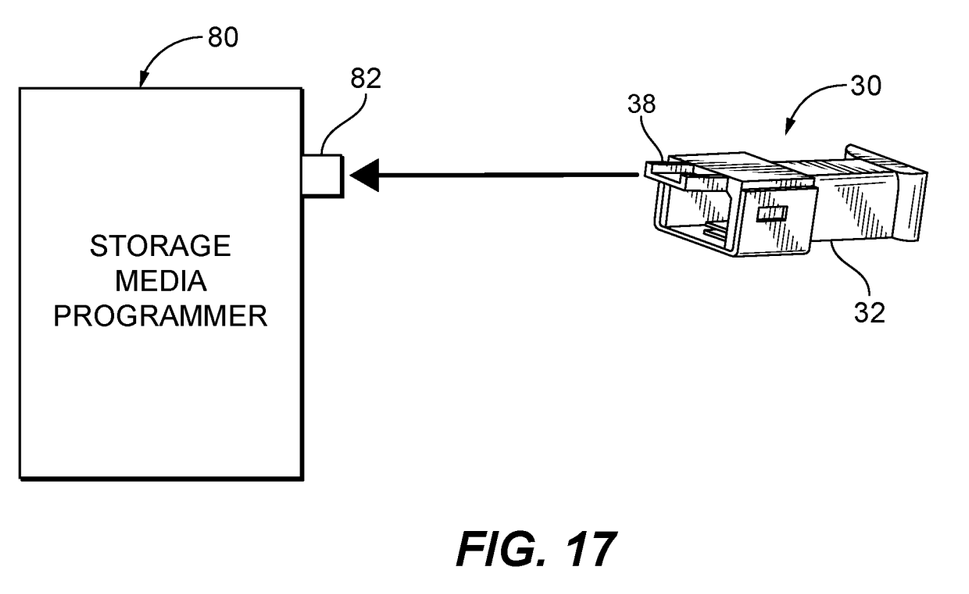
FIG. 17 is a block diagram of a portable, hand-held storage media programming tool contemplated by the present disclosure.

Referring to FIG. 2, extending from a front face of the body 32 is a media interface housing 38 that is configured to receive one or more storage media 70, seen in FIG. 4. In this exemplary embodiment, the one or more storage media 70 are electrical type storage media. Non-limiting examples of electrical type storage media include EEPROM's or other memory chips that can store information, or that can be programmed to store such information. The information stored on the storage media 70 includes, for example, identifying data and cable characteristics. Non-limiting examples of the connector identifying data and cable characteristics include connector ID, connector type, cable color, cable length, cable ID, cable fiber type, and any other desired information. The present disclosure also contemplates a portable, hand held storage media programmer 80, seen in FIG. 17, that includes an adapter 82 configured to couple to the media interface housing 38 so that electrical contacts within the adapter 82 can contact the one or more storage media 70 to program the one or more storage media with the desired information, for example, the connector, cable and/or other information. It is noted that electrical type storage media on a connector is also known as "chip on a connector."

Figure 5:
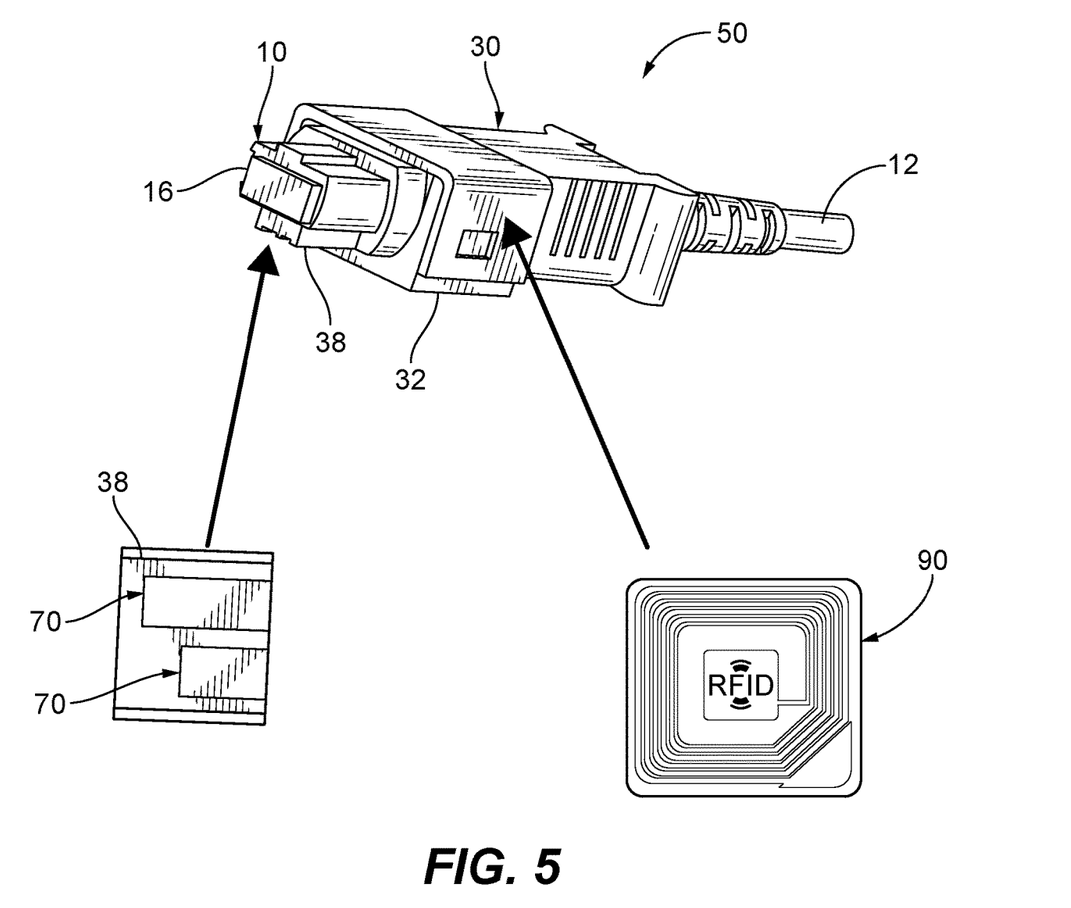
FIG. 5 is a perspective view of another exemplary embodiment of a fiber optic high-density connector according to the present disclosure, illustrating a chip assembly and RFID tag incorporated into the fiber optic high-density sleeve.

Referring to FIG. 5, in addition to having a chip on a connector, the sleeve 30 may also include an RFID tag or a near field communication (NFC) device. In one exemplary embodiment, an RFID tag 90 may be secured to the exterior of the body 32 and covered with a protective member or material so that the integrity of the RFID tag is not diminished. In another exemplary embodiment, an inner wall 36 of the sleeve body 32 may include a recess that is configured and dimensioned to receive the RFID tag. The RFID tag can be secured within the recess using an adhesive, such as an epoxy adhesive. The RFID tag can store connector identifying data and cable characteristics, such as for example, connector ID, connector type, cable color, cable length, cable ID, cable fiber type, etc. The RFID tag 90 can be any type of RFID tag known in the art and can be read using known RFID readers.

Figure 6:
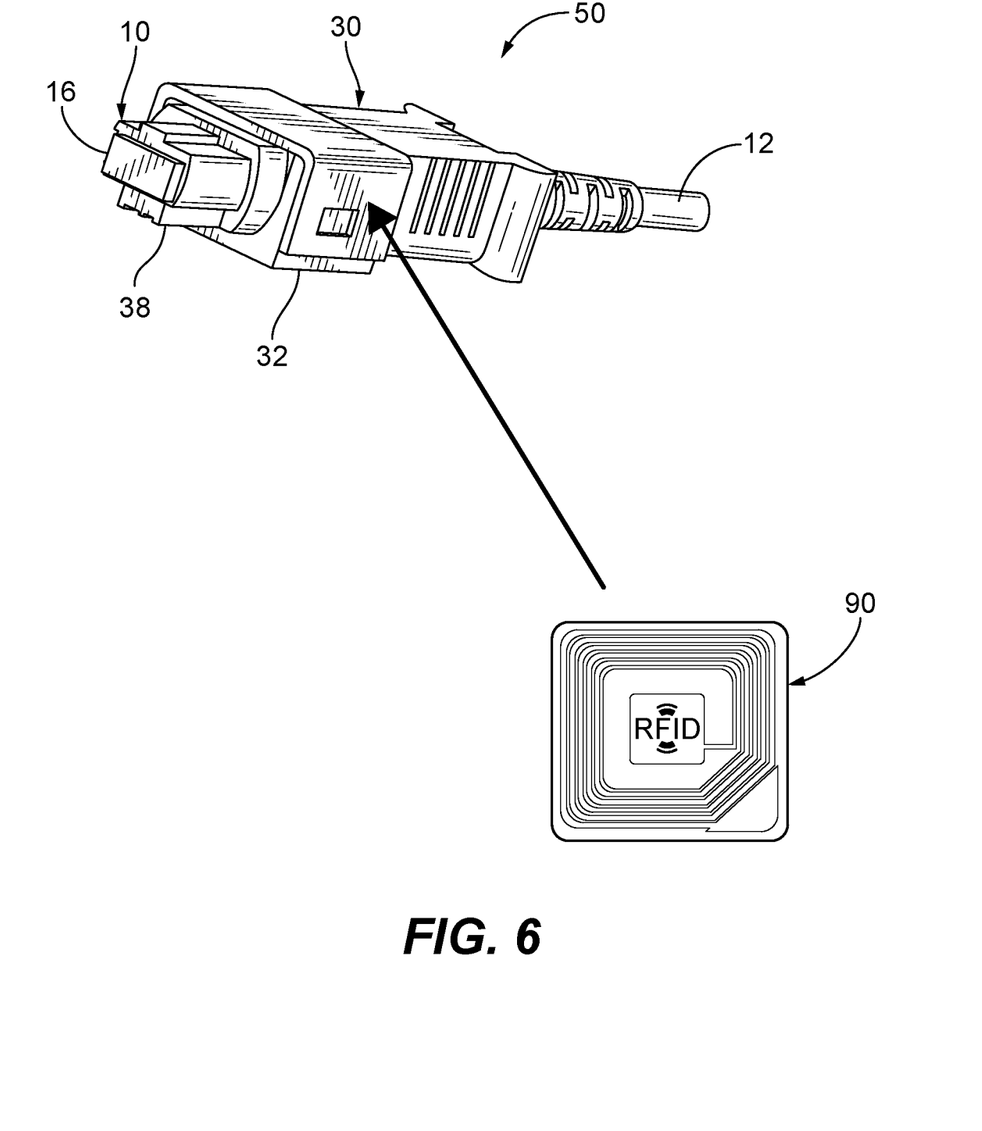
FIG. 6 is a perspective view of another exemplary embodiment of a fiber optic high-density connector according to the present disclosure, illustrating a RFID tag incorporated into the fiber optic high-density sleeve.

Referring to FIG. 6, in another exemplary embodiment, the sleeve 30 may include an RFID tag or a near field communication (NFC) device without the storage media. In one exemplary embodiment, an RFID tag 90 may be secured to the exterior of the body 32 and covered with a protective member or material so that the integrity of the RFID tag is not diminished. In another exemplary embodiment, an inner wall 36 of the sleeve body 32 may include a recess that is configured and dimensioned to receive the RFID tag. The RFID tag can be secured within the recess using an adhesive, such as an epoxy adhesive. The RFID tag can store connector identifying data and cable characteristics, such as for example, connector ID, connector type, cable color, cable length, cable ID, cable fiber type, etc. As noted, the RFID tag 90 is known in the art and can be read using known RFID readers.

Figure 7:
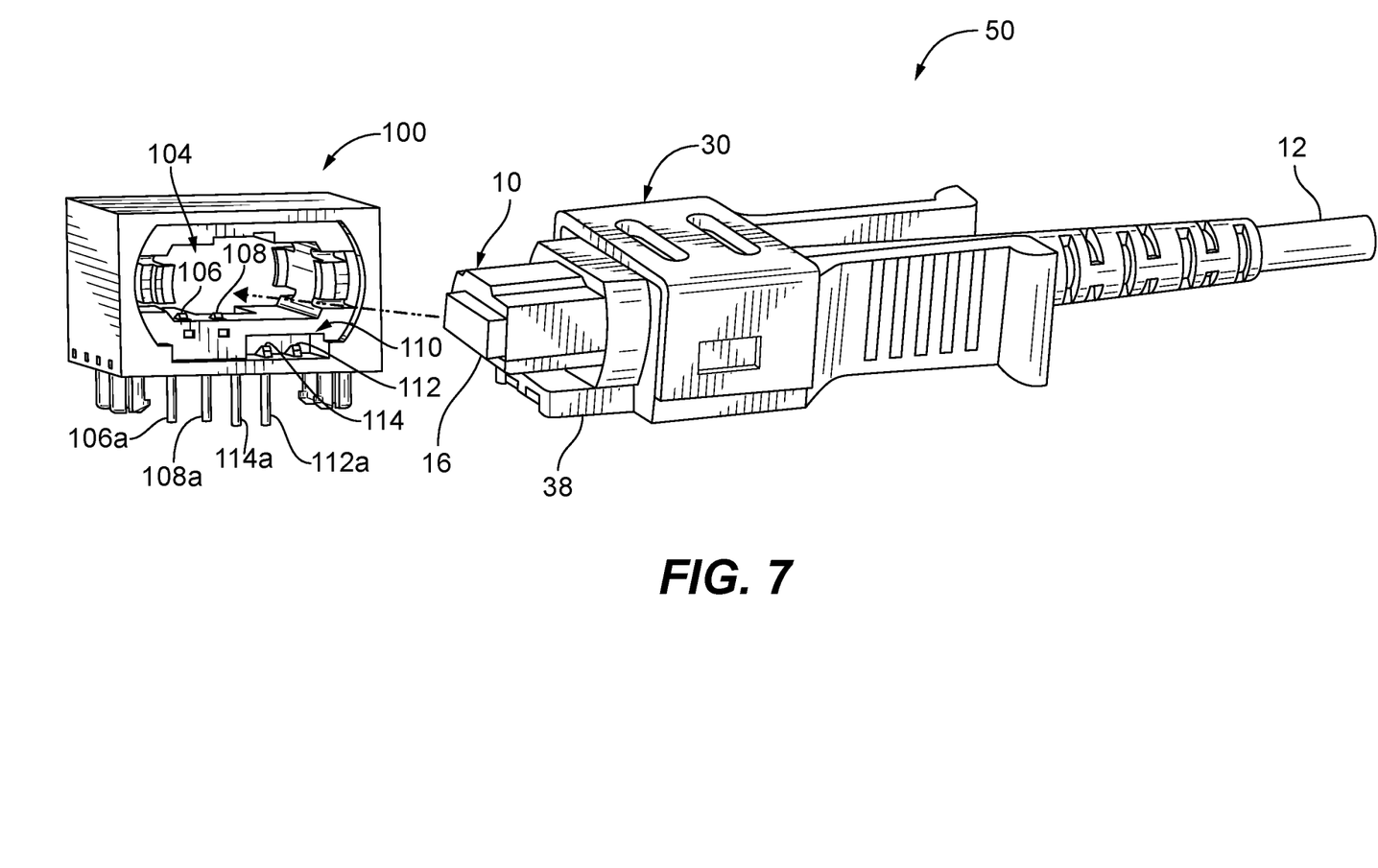
FIG. 7 is a perspective view with parts separated of an exemplary embodiment of a fiber connector assembly according to the present disclosure, illustrating a fiber optic high-density adapter and a fiber optic high-density connector with fiber optic high-density sleeve of FIG. 3.
Figure 8:
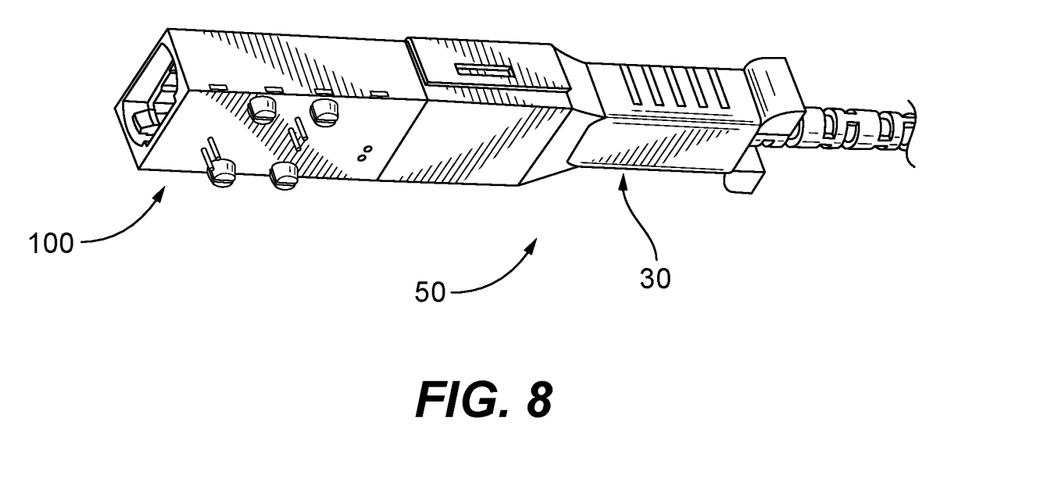
FIG. 8 is a perspective view of the fiber connector assembly of FIG. 7, illustrating the fiber optic high-density adapter coupled to the fiber optic high-density connector with the fiber optic high-density sleeve.
Figure 9:
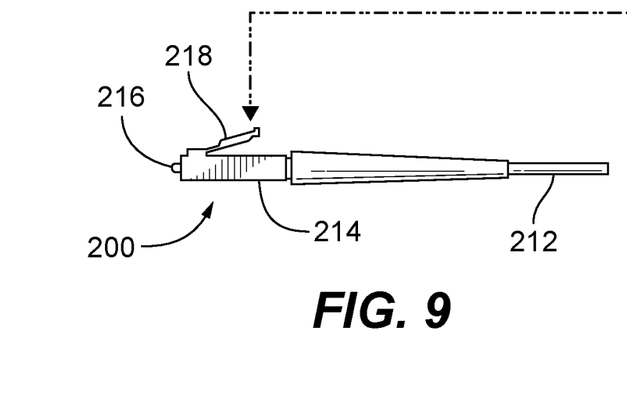
FIG. 9 is a perspective view of a fiber optic low-density connector.

Referring to FIGS. 7 and 8, an exemplary embodiment of a multi-fiber adapter according to the present disclosure is shown. In this exemplary embodiment, the multi-fiber adapter 100 is a MPO adapter that may be secured to, for example, an adapter module (not shown) or a front or rear panel of a housing of network device, such as a server, patch panel, switch, etc. The adapter 100 includes a housing 102 having a central opening 104 configured to receive the ferrule 16 of a multi-fiber connector assembly 50. Within the central opening is a presence detecting switch that includes pins 106 and 108, each having an electrical contact 106a and 108a extending from the housing 102 as shown. The presence detecting switch pins 106 and 108 are used to detect the presence of a connector 10 within the central opening 104 of the adapter housing 102. More specifically, when the ferrule 16 of a connector 10 is inserted into the central opening 104, seen in FIG. 8, the presence detecting switch pins 106 and 108, seen in FIG. 7, are depressed creating an electrical path between electrical contact 106a and 108a which can be measured. The adapter housing 102 also includes a storage media read/write interface 110 that is configured to receive the media interface housing 38 extending from the connector body 32. The storage media read/write interface 110 includes one or more media read/write contacts 112 and 114, seen in FIG. 7, each having an electrical lead 112a and 114a extending from the adapter housing 102. The media read/write contacts 112 and 114 are configured to contact a respective storage media 70 within the media interface housing 38 so that information stored on the storage media can be read via the electrical lead 112a and/or 114a, as is known.

Figure 10:
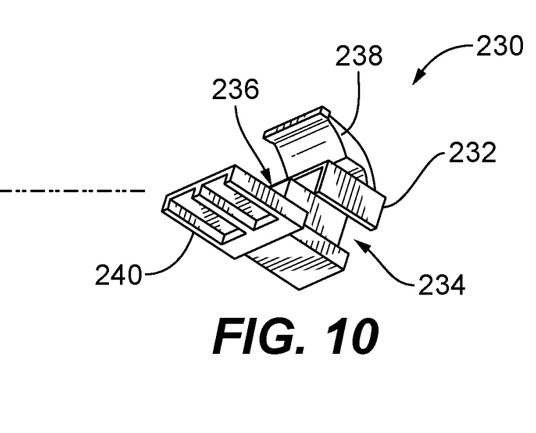
FIG. 10 is a perspective view of an exemplary embodiment of a fiber optic low-density sleeve according to the present disclosure.
Figure 11:
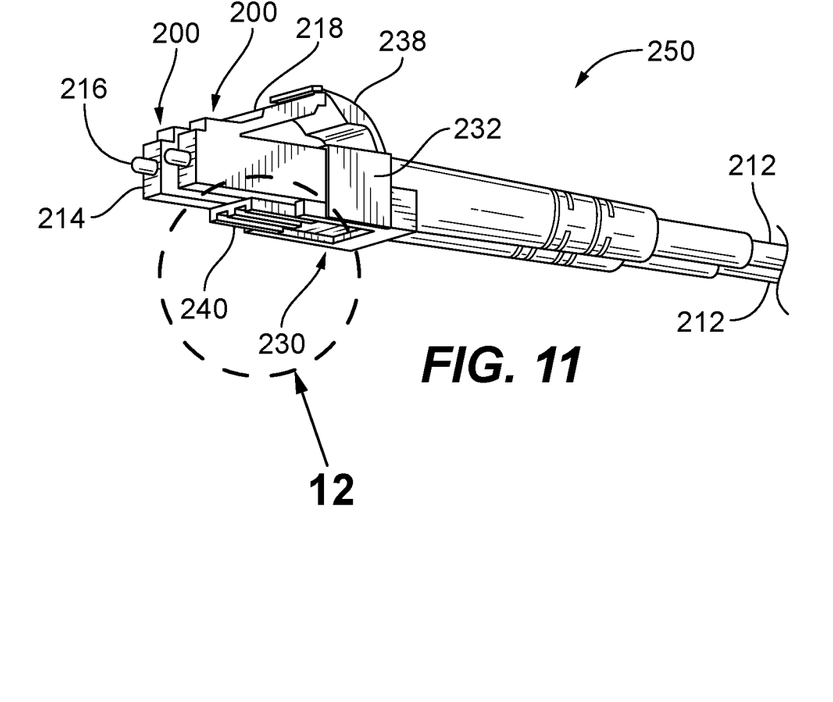
FIG. 11 is a perspective view of an exemplary embodiment of a fiber optic low-density connector with the fiber optic low-density sleeve according to the present disclosure.
Figure 12:
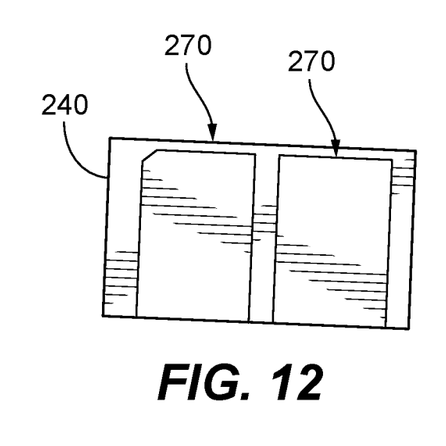
FIG. 12 is a bottom plan view of a chip assembly incorporated into the fiber optic low-density sleeve of FIG. 11 taken from detail 12 in FIG. 11.

Referring to FIGS. 9-12, an exemplary embodiment of a single fiber connector with a single fiber sleeve according to the present disclosure is shown. The single fiber connector 200 may be a male connector or a female connector. The single fiber connector 200 is, in this exemplary embodiment, a known LC connector that can be operatively connected to a single fiber cable 212. Typically, single fiber connectors are paired to provide a transmit fiber and a receive fiber. Thus, in this exemplary embodiment, the sleeve 230 is configured to fit over the housings 214 of two connectors 200, as seen in FIG. 11, so that the ferrule 216 of each connector can mate with a paired adapter, as described below. In this exemplary embodiment, the connectors 200 and sleeve 230 are collectively the assembly 250, seen in FIG. 11. In one exemplary embodiment shown in FIG. 10, the sleeve 230 has a body 232 that is configured with a left side connector opening 234 and a right side connector opening 236, seen in FIG. 10. The openings 234 and 236 are configured so that the connector housings 214 can snap into the respective opening 234 or 236. To interlock the sleeve 230 to each connector housing 214, tabs may extend from one or more inner walls of the openings 234 and/or 236 that snap into corresponding slots in the respective connector housing 214. In another exemplary embodiment, the sleeve 230 may be a two-piece structure that include a first half and a second half that can snap together around the connector housings 214. In another exemplary embodiment, the sleeve 230 may be integrally molded into the connector housings 214.

Continuing to refer to FIGS. 10 and 11, extending from an upper surface of the body 232 is a release lever 238 that interacts with the locking arms 218 extending from the connector housing 214 used to lock the connector 200 to an adapter, as is known. Extending from the bottom of the body 232 is a media interface housing 240 that is configured to receive one or more storage media 270, seen in FIG. 12. In this exemplary embodiment, the one or more storage media 270 are electrical type storage media. Non-limiting examples of electrical type storage media 270 include an EEPROM or other memory chip that can store information, such as connector identifying data and cable characteristics, or that can be programmed to store such information. Non-limiting examples of the connector identifying data and cable characteristics include connector ID, connector type, cable color, cable length, cable ID, cable fiber type, and any other desired information. As noted above, the present disclosure also contemplates a portable, hand held storage media programmer 80, seen in FIG. 17, that includes an adapter 82 configured to couple to the media interface housing 240 so that pins within the adapter 82 can contact the one or more storage media 270 to program the one or more storage media with information about, for example, the connector, cable and/or other information.

Figure 13:
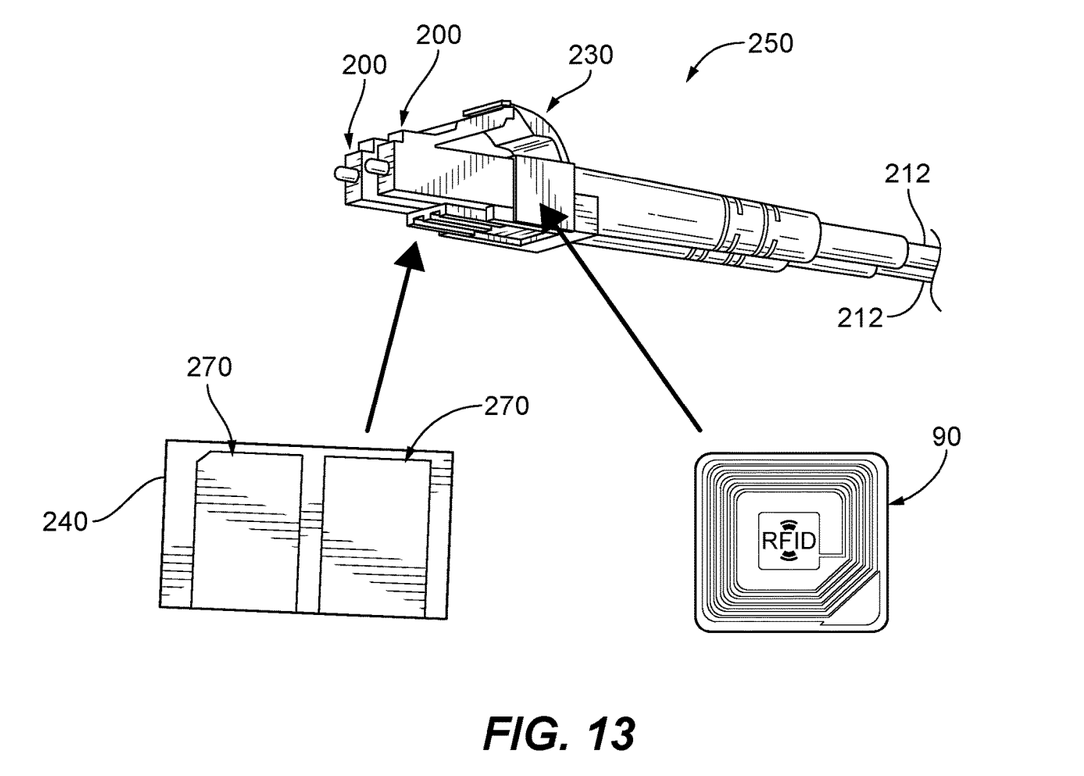
FIG. 13 is a perspective view of another exemplary embodiment of a fiber optic low-density connector according to the present disclosure, illustrating a chip assembly and RFID tag incorporated into the fiber optic low-density sleeve.

Referring to FIG. 13, in addition to having a storage media 270, the sleeve 230 may also include an RFID tag or a near field communication (NFC) device. In one exemplary embodiment, the RFID tag 90 may be secured to the exterior of the body 232 and covered with a protective member or material so that the integrity of the RFID tag is not diminished. In another exemplary embodiment, an inner wall of the sleeve body 232 may include a recess that is configured and dimensioned to receive the RFID tag. The RFID tag can be secured within the recess using an adhesive, such as an epoxy adhesive. The RFID tag 90 can store connector identifying data and cable characteristics, such as for example, connector ID, connector type, cable color, cable length, cable ID, cable fiber type, etc.

Figure 14:
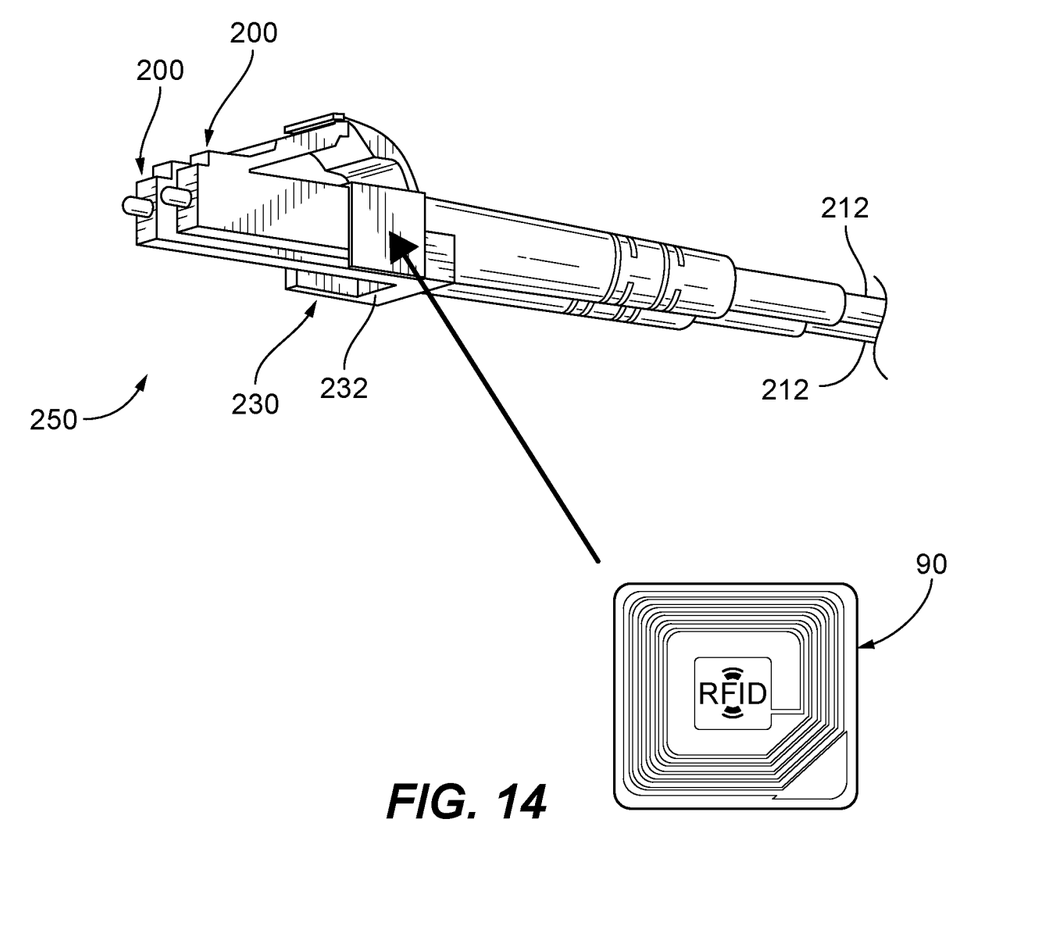
FIG. 14 is a perspective view of another exemplary embodiment of a fiber optic low-density connector according to the present disclosure, illustrating a RFID tag incorporated into the fiber optic low-density sleeve.

Referring to FIG. 14, in another exemplary embodiment, the sleeve 230 may include an RFID tag or a near field communication (NFC) device without the chip on connector. In one exemplary embodiment, the RFID tag 90 may be secured to the exterior of the body 232 and covered with a protective member or material so that the integrity of the RFID tag is not diminished. In another exemplary embodiment, an inner wall of the sleeve body 232 may include a recess that is configured and dimensioned to receive the RFID tag. The RFID tag can be secured within the recess using an adhesive, such as an epoxy adhesive. The RFID tag can store connector identifying data and cable characteristics, such as for example, connector ID, connector type, cable color, cable length, cable ID, cable fiber type, etc.

Figure 15:
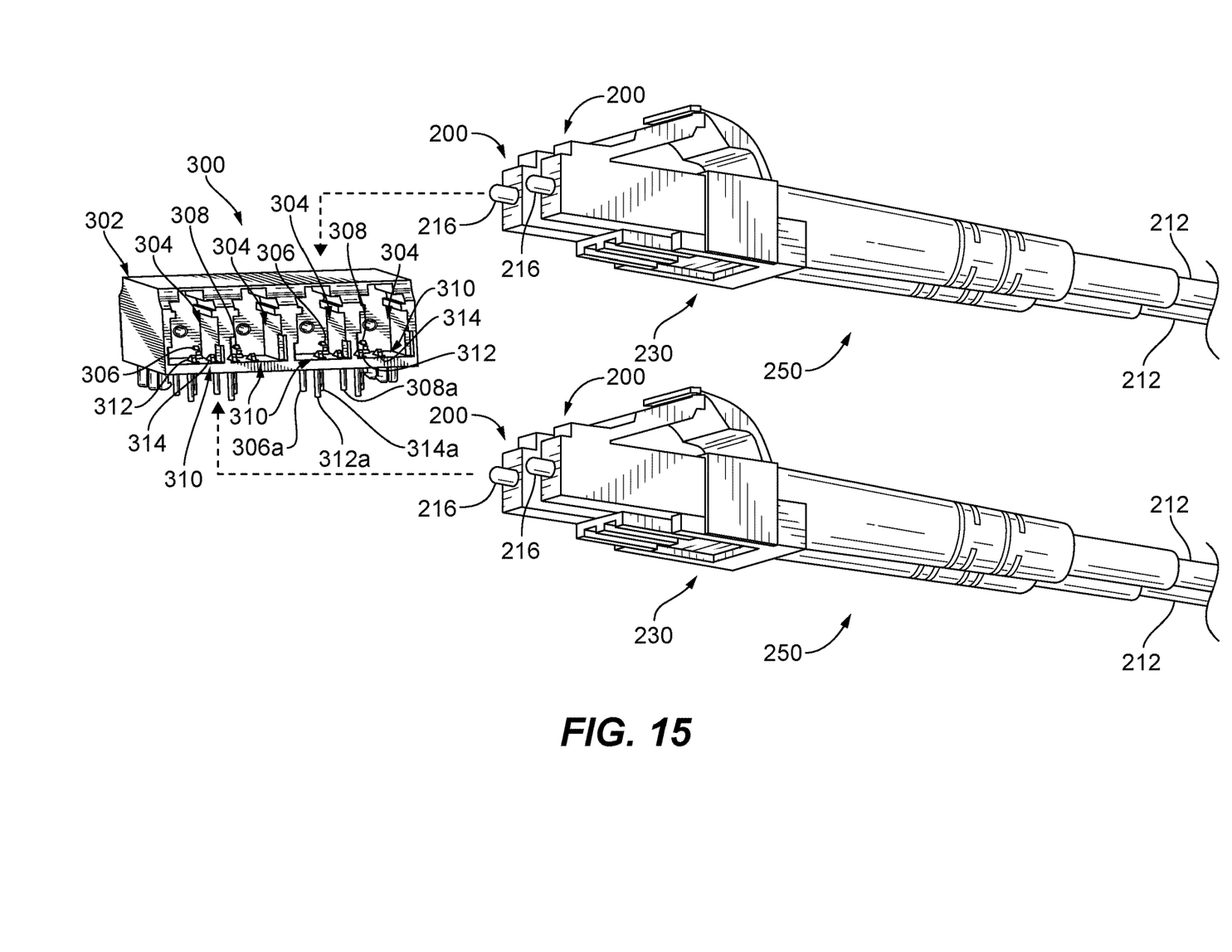
FIG. 15 is a perspective view with parts separated of another exemplary embodiment of a fiber connector assembly according to the present disclosure, illustrating a fiber optic low-density adapter and a fiber optic low-density connector with fiber optic low-density sleeve of FIG. 11.
Figure 16:
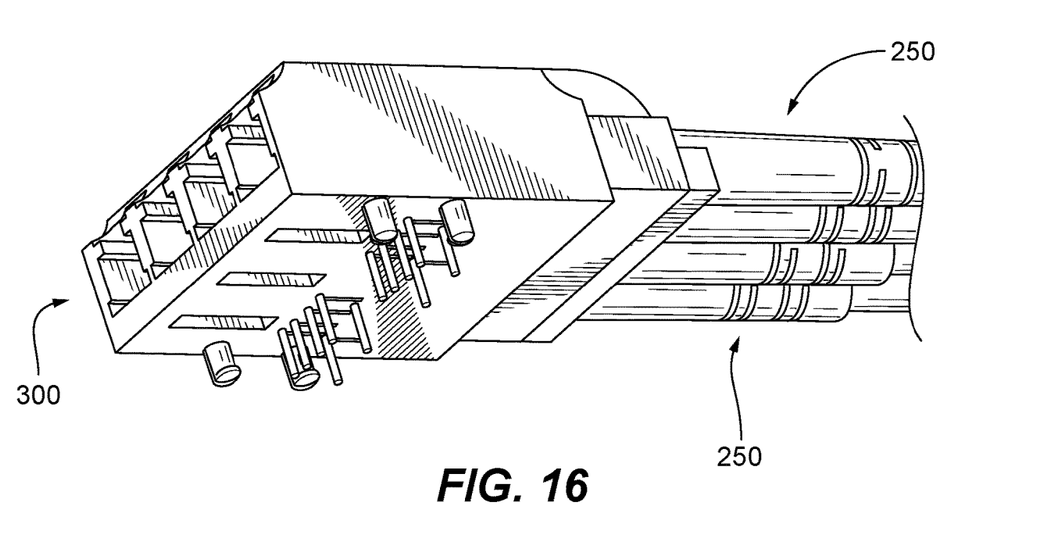
FIG. 16 is a perspective view of the fiber connector assembly of FIG. 15, illustrating the fiber optic low-density adapter coupled to multiple fiber optic low-density connectors with fiber optic low-density sleeve.

Referring to FIGS. 15 and 16, an exemplary embodiment of a single fiber adapter according to the present disclosure is shown. In this exemplary embodiment, the single fiber adapter 300 is a LC adapter that may be secured to, for example, an adapter module (not shown) or a front or rear panel of a housing of network device, such as a server, patch panel, switch, etc. The adapter 300 is a quad adapter where two ports are associated with one assembly 250 and the other two ports are associated with another assembly 250. The adapter 300 includes a housing 302 having central openings 304 configured to receive the ferrules 216 from the two single fiber connector assemblies 250. Within the central openings 304, representing two ports, is a presence detecting switch that includes pins 306 and 308 operatively connected between electrical contact 306*a* and 308*a* extending from the housing 302 as shown. Each presence detecting switch is used to detect the presence of the connectors 200 within the central openings 304 of the adapter housing 302. More specifically, when the ferrules 216 of connectors 200 are inserted into the central openings 304, seen in FIG. 16, the presence detecting switch pins 306 and 308, seen in FIG. 15, are depressed creating an electrical path between electrical contact 306*a* and 308*a* which can be measured. The adapter housing 302 also includes storage media read/write interfaces 310, each configured to receive the media interface housing 240 extending from a corresponding connector body 232. Each storage media read/write interface 310 includes one or more media read/write contacts 312 and 314, seen in FIG. 15, each having an electrical lead 312*a* and 314*a* extending from the adapter housing 302. The media read/write contacts 312 and 314 are configured to contact a respective storage media 270 within the media interface housing 240 so that information stored on the storage media can be read via the electrical lead 312*a* and/or 314*a*.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A fiber optic cable connector assembly comprising:
   a fiber optic cable connector including:
   a connector housing configured to be coupled to a single fiber or multi-fiber optical cable, the connector housing having a cable end and a free end, the cable end includes at least one slot and is configured to receive the single fiber or multi-fiber optical cable; and
   a ferrule extending from the free end of the connector housing;
   a sleeve that is independent of the fiber optic cable connector, the sleeve including:

sleeve body having a front face, inner walls defining a central sleeve opening, and at least one tab extending from at least one inner wall of the sleeve body toward the central sleeve opening;
a media interface housing extending from the front face of the sleeve body; and
at least one electrical storage media within the media interface housing;
wherein the central sleeve opening is configured to receive the connector housing so that the sleeve body surrounds at least a portion of the connector housing and the at least one tab of the sleeve body is positioned in the at least one slot of the connector housing to interlock the sleeve body to the connector housing so that sleeve body is fixed in position relative to the connector housing and at least the ferrule extends outside the front face of the sleeve adjacent the media interface housing; and
a fiber optic cable adapter comprising:
an adapter body having a central adapter opening configured to receive at least the ferrule;
a presence detecting switch configured to actuate when the ferrule is inserted into the central adapter opening; and
a storage media interface that is capable of reading from and writing to the at least one electrical storage media.

2. The fiber optic cable connector assembly according to claim 1, further comprising an RFID tag secured to the sleeve body.

3. The fiber optic cable connector assembly according to claim 1, wherein the fiber optic cable connector comprises a multi-fiber cable connector and the fiber optic cable adapter comprises a multi-fiber cable adapter.

4. The fiber optic cable connector assembly according to claim 1, wherein the at least one electrical storage media comprises an EEPROM.

5. A fiber optic cable connector assembly comprising:
a fiber optic cable connector including:
a connector housing configured to be coupled to a single fiber or multi-fiber optical cable, the connector housing having a cable end and a free end, the cable end of the connector housing having at least one slot and
a ferrule extending from the free end of the connector housing;
a sleeve that is independent of the fiber optic cable connector, the sleeve including:
a sleeve body having a front face, inner walls defining a central sleeve opening and at least one tab extending from at least one inner wall of the sleeve body toward the central sleeve opening, the central opening being configured to receive the connector housing so that the sleeve body surrounds at least a portion of the connector housing, and when the sleeve body is interlocked with the connector housing by having the at least one tab of the sleeve body positioned in the at least one slot of the connector housing, the sleeve body is fixed in position relative to the connector housing and at least the ferrule extends outside the front face of the sleeve;
a media interface housing extending from the front face of the sleeve body adjacent the ferrule when the sleeve body is affixed to the connector housing, and having at least one electrical storage media within the media interface housing; and
a RFID tag secured to the sleeve body; and
a fiber optic cable adapter comprising:
an adapter body having a central adapter opening configured to receive at least the ferrule;
a presence detecting switch configured to actuate when the ferrule is inserted into the central adapter opening; and
a storage media interface that is capable of reading from and writing to the at least one electrical storage media.

6. The fiber optic cable connector assembly according to claim 5, wherein the fiber optic cable connector comprises a multi-fiber cable connector and the fiber optic cable adapter comprises a multi-fiber cable adapter.

7. The fiber optic cable connector assembly according to claim 5, wherein the at least one electrical storage media comprises an EEPROM.

8. A fiber optic cable connector assembly comprising:
a fiber optic cable connector including:
a connector housing configured to be coupled to a single fiber or multi-fiber optical cable, the connector housing having a cable end and a free end; and
a ferrule extending from the free end of the connector housing; and
a sleeve that is independent of the connector housing, the sleeve including:
a sleeve body with a front face and inner walls defining a central sleeve opening, the central sleeve opening being configured to receive the connector housing so that the sleeve body surrounds at least a portion of the connector housing, and when the sleeve body is interlocked with the connector housing the sleeve body is fixed in position relative to the connector housing and at least the ferrule extends outside the front face of the sleeve body;
a media interface housing extending from the front face of the sleeve body adjacent the ferrule when the sleeve body is interlocked with the connector housing; and
at least one electrical storage media within the media interface housing.

9. The fiber optic cable connector according to claim 8, further comprising an RFID tag secured to the sleeve body.

10. The fiber optic cable connector according to claim 8, wherein the connector housing comprises a multi-fiber cable connector housing.

11. The fiber optic cable connector according to claim 8, wherein the at least one electrical storage media comprises an EEPROM.

12. A fiber optic cable connector assembly comprising:
a connector housing having a cable end and a free end and a ferrule extending from the free end of the connector housing; and
a sleeve that is independent of the connector housing, the sleeve including:
a sleeve body having a front face and inner walls defining a central sleeve opening, the central sleeve opening being configured to receive the connector housing so that the sleeve body surrounds at least a portion of the connector housing, and when the sleeve body is interlocked with the connector housing the sleeve body is fixed in position relative to the connector housing and at least the ferrule extends outside the front face of the sleeve;
a media interface housing extending from the front face of the sleeve body adjacent the ferrule when the sleeve body is interlocked with the connector housing, and having at least one electrical storage media within the media interface housing; and a RFID tag secured to the sleeve body.

13. The fiber optic cable connector according to claim 12, wherein the connector housing comprises a multi-fiber cable connector housing.

14. The fiber optic cable connector according to claim 12, wherein the at least one electrical storage media comprises an EEPROM.

* * * * *